(12) United States Patent
Borsinger et al.

(10) Patent No.: US 7,267,743 B2
(45) Date of Patent: Sep. 11, 2007

(54) WAX EMULSION COATING APPLICATIONS

(75) Inventors: Gregory G. Borsinger, Chatham, NJ (US); Abbas Hassan, Sugarland, TX (US)

(73) Assignee: Marcus Oil and Chemical, Houston, TX (US)

( * ) Notice: Subject to any disclaimer, the term of this patent is extended or adjusted under 35 U.S.C. 154(b) by 417 days.

(21) Appl. No.: 10/388,548

(22) Filed: Mar. 17, 2003

(65) Prior Publication Data

US 2006/0289138 A1    Dec. 28, 2006

(51) Int. Cl.
*D21C 5/02*   (2006.01)
*D21H 17/60*  (2006.01)
*C08L 91/06*  (2006.01)

(52) U.S. Cl. ............ 162/5; 162/172; 162/179; 516/38; 516/43; 516/46

(58) Field of Classification Search ........... 162/5, 162/172, 179; 516/38, 43, 46
See application file for complete search history.

(56) References Cited

U.S. PATENT DOCUMENTS

| | | | | |
|---|---|---|---|---|
| 5,023,108 A * | 6/1991 | Bagaria et al. | ............ | 427/2.15 |
| 5,251,398 A * | 10/1993 | Balassa | ............ | 47/2 |
| 5,403,392 A | 4/1995 | Craig | ............ | 106/162 |
| 6,039,960 A * | 3/2000 | Chung et al. | ............ | 424/401 |
| 6,053,439 A | 4/2000 | Locke et al. | | |
| 6,255,375 B1 | 7/2001 | Michelman | | |
| 6,273,993 B1 | 8/2001 | Michelman | | |
| 6,277,310 B1 | 8/2001 | Sleeter | | |
| 6,416,620 B1 | 7/2002 | Narancic et al. | | |
| 6,488,941 B1 * | 12/2002 | Burnier et al. | ............ | 424/401 |
| 6,488,946 B1 * | 12/2002 | Milius et al. | ............ | 424/401 |

FOREIGN PATENT DOCUMENTS

GB       915759       1/1963
WO       WO 87/04070  7/1987

OTHER PUBLICATIONS

Kirk-Othmer Encyclopedia of Chemical Technology, John Wiley & Sons, Inc. 1998, topic: Waxes, section: Vegetable Waxes [online][retreived Mar. 14, 2006] Retreived from <www.mrw.interscience.wiley.com/kirk/articles/waxecott.a01/sect3.html>.*
Campbell & Co product data sheet, Campbell and Co., copyright 1998-2002 [online][retreived Mar. 14, 2006] Retrieved from the Internet:<URL:www.campbell-uv.com/castor.html>.*

* cited by examiner

*Primary Examiner*—Eric Hug
*Assistant Examiner*—Dennis R. Cordray
(74) *Attorney, Agent, or Firm*—Thomas L. Adams; Benjamin Appelbaum (57) ABSTRACT

Waxes prepared from hydrogenated plant oils, such as castor, palm, and soybean, are used to prepare water based emulsions. The inventive waxes, obtained from naturally derived, renewable resources, were emulsified under anionic, cationic and nonionic conditions, producing emulsions having a solids content up to about 45% solids. When used to coat fibrous cellulosic articles, such as paperboard, the emulsions' performance was similar to emulsions containing petroleum-derived waxes. The inventive waxes have a low iodine value (between 2-5), and melting points between approximately 120-200 degrees F. (Mettler Drop Point). These waxes comprise a triglyceride whose fatty acids are predominantly stearic acid or ricinoleic acid. The inventive waxes are used as an alternative to petroleum-derived, or expensive naturally-occurring waxes in the manufacture of emulsions used in coatings, polishes, adhesives, paper products, paperboard, in the removal of ink from fibrous cellulosic products and other manufacturing operations.

4 Claims, 2 Drawing Sheets

Fig. 1 Process for the manufacture of Hydrogenated oils

Figure 2. The effects of coating citrus fruit with a soy wax-based emulsion on weight loss.

WAX EMULSION COATING APPLICATIONS

FIELD OF THE INVENTION

Emulsions prepared using a wax derived from vegetable sources are used in a variety of applications, such as to coat fibrous cellulosic products, such as paper and wood, to render them moisture-resistant, and could be used with gypsum sheet goods. These emulsions are used as fruit coatings to improve moisture resistance. The emulsions comprise water, the vegetable wax and a surface-active agent. The vegetable waxes, derived from sources such as castor oil, palm or soybeans, comprise triglycerides with a melting point ranging about 136-200 degrees F. The solids content of the emulsions can be as high as 45% solids, based on the total weight of the emulsion.

BACKGROUND OF THE INVENTION

Wax based emulsions are used in numerous industrial applications, for example, for coating fibrous cellulosic products, such as paper, corrugated cardboard, kraft paper, boxboard and the like, to impart moisture resistance to the product. Wax emulsions usually comprise between about 15% to 40% (by weight) wax, and with from about 5% to 25% surface-active agent added based on the weight of the wax. Emulsions are used in lieu of applying molten wax because of their ease of handling, application and ability to formulate with other aqueous based ingredients. Once prepared, an emulsion may remain stable (i.e., it will not separate into its components) over a prolonged period of time. This stability facilitates factors such as shipment of the emulsion from manufacturer to the end-user, storage, and its use in particular applications By contrast, application of molten wax requires that the wax be melted as needed, maintaining it in a molten state, and applying it in a molten state.

Wax emulsions are typically manufactured either in batch reactors or with the use of a homogenizer. It is important that the equipment used to prepare emulsions be capable of effecting agitation of the reactants to achieve thorough mixing, and have proper temperature controls to maintain adequate heating and cooling of the reagents and the products. In general, use of a homogenizer has been known to effect a higher percentage of solids in the final emulsion product than that obtained with emulsions prepared using mixing in conventional stirred batch reactors. Both types of equipment have been used successfully to manufacture the emulsions of the present invention.

It is desirable to utilize an emulsion that has as high a content of wax solids as practical for certain applications. For example, where goods such as paper products, fruits or pharmaceuticals are treated with a wax, it is desirable to minimize the drying time of the treated product, and one way to achieve this end is with the use of an emulsion having a high wax solids content. In those instances where the emulsions must be transported over long distances, reducing the volume amount helps to reduce transportation costs. Water based emulsions are also preferable to organic solvent based emulsions (or dispersions) of wax, because of the potential to pollute the environment or adversely affect health and safety.

Wax based emulsions are typically formulated to have a certain ionic charge, usually to render the emulsion compatible with other ingredients to be formulated with the wax emulsion at a later time. Wax emulsions can be either anionic, nonionic or cationic depending upon the emulsifier, generally a surface-active agent such as a surfactant, used to make the wax emulsion.

Waxes that are to be emulsified must have some functionality such as carboxyl, acid or ester groups attached to the wax polymer. In the process of emulsification these functional groups are saponified to render them more hydrophilic, thus allowing the selected surfactant to form a micelle around the wax. Bases that are commonly used to saponify functional groups of the wax include potassium hydroxide (KOH), sodium hydroxide (NaOH) and amines such as ammonia, diethyl amine ("DEA") and other amine derivatives. For the preparation of certain emulsion types, acids, such as glacial acetic acid or similar acids, are utilized for functional group modification. The quantity of functional groups that need to be modified in order to form a stable emulsion can vary depending on characteristics of the wax such as its molecular weight and amount of chain branching. Generally, a wax with a minimum saponification value of about 20-30 mg KOH/g wax can be readily emulsified. The saponification value, or number, represents the quantity, in milligrams of KOH which react with one gram of wax under elevated temperatures, and indicates the amount of free carboxylic acid plus any esters which may be saponified. This value, and the acid number, described below, provide an indication of the free carboxylic acid and ester content of the wax. ASTM D1387 is an example of how a saponification number is determined. The ASTM D1386 represents a method to determine the acid number; the quantity, in milligrams, of KOH necessary to neutralize one gram of wax, indicating the amount of free carboxylic acid present.

A common first step in the emulsification process is to dissolve the wax (by heating where necessary) and add sufficient base to saponify the desired number of functional groups on the wax. Surfactant is then added and the emulsion is allowed to form under good agitation. If a homogenizer is used in manufacturing the emulsions the shearing action of the homogenizer also affects the resulting particle size of the wax emulsion. The saponification of the wax becomes less critical when emulsions are prepared using a homogenizer because of the contributions of mechanical shearing of the wax. In general, the most stable emulsions (generally having the smallest particle sizes) are produced with a combination of saponification with good mixing.

Parameters that usually characterize the quality of the emulsion once it has been formed include the clarity and stability of the emulsion. Stability is generally measured as the degree of separation of the emulsion into its component phases over time.

Hardness, defined by ASTM D 1321 and ASTM D-5, relates to the distance (in tenths of a millimeter, dmm) that a specified needle penetrates a wax under a given weight at a given temperature. A "soft" wax has hardness properties of >10 mm of penetration, and are considered to be "less" useful, while waxes having hardness values of <10 mm penetration are considered to be more useful in these preparations.

The color of a particular wax preparation varies from batch to batch, even of the same wax. Factors such as the rate of cooling of the wax, the quantity of occluded air, and the surface finish affect the overall color of a solidified wax preparation. Generally, the color of a wax is determined on a molten wax preparation, using either the ASTM D1500 (Gardner) or the ASTM D156 (Seybolt) method. The ASTM D1500 method is generally used to measure dark-brown to off-white colors, while the ASTM D156 is used for measurement of off-white to pure white colors.

For applications such as coating of foods, or of pharmaceutical tablets, it is desirable to use waxes that are characterized by having low penetration hardness, and good color characteristics (towards the white end of the color scale as opposed to the brown end).

Wax emulsions are often used by themselves, or in combination with other ingredients when coated onto paper, paperboard, linerboard, or other paper products to render it moisture resistant. Food items, such as fish, or vegetables such as broccoli, for example, are often packaged and shipped in paper boxes that are coated with wax. The wax coating helps to maintain the strength and integrity of the package when it encounters a moist environment, such as the presence of ice in the package, transportation in refrigerated vehicles, and refrigerated storage environments. Other properties, such as the gloss, slip resistance and printability on or of the finished paper product, depending on the end use application, also are affected by a wax coating. Once the wax coated packaging has been used, it is generally discarded.

There is an increasing trend, both domestically and internationally, to recycle paper products once the packaged item is used and the wax-coated packaging has been disposed by the consumer. However, in the recycling process the wax coating on the packaging tends to form what is known in the industry as "stickies" and "tackies", whose presence causes problems in the recycling equipment. This problem has become so prevalent that in some localities wax coated paper products are required to be excluded from the recycling process. Consequently, the wax-coated articles are segregated, and instead of being recycled, are sent either to be incinerated or disposed of in landfills. Alternate techniques have been proposed and used to minimize wax contamination of the recycling process, including the use of additives added to the wax, (U.S. Pat. Nos. 6,255,375 and 6,273,993 to Michelman; U.S. Pat. No. 6,416,620 to Narancic et al.; and U.S. Pat. No. 6,053,439 to Locke et al.). None of these approaches has been universally accepted as a solution to the problems associated with wax in the recycling process.

Oil companies such as CITGO, ExxonMobil, Shell Oil and others are among the commercial sources for waxes derived from petroleum Most of these waxes are derived in the process of refining lube oil, where the wax is separated from the lube oil stock and refined into various wax fractions, including paraffins and microcrystalline waxes. Additional commercial sources of waxes include formulators such as Astor Wax, IGI and Moore & Munger, who supply wax for prior art applications; these axes are often either resold "as is" from the oil companies, and/or formulated and repackaged to meet specific customer needs. Other commercial suppliers, such as Michelman (Ohio) and ChemCore (New York), often referred to as "emulsion houses" convert various waxes into emulsions which are used for coating and other applications.

The prior art describes using petroleum-derived waxes and synthetic waxes for incorporation into emulsions, but does not mention using vegetable-derived waxes in emulsions. Given that the world's oil supply is finite, and is being depleted, there is a recognized and long-felt need to find alternatives to petroleum-derived products, such as petroleum waxes, that are derived from limited natural resources whose supply is being diminished. Because wax emulsions are frequently used in food packaging applications, it is also desirable for the wax to have food grade properties for safety. There is also a recognized and long-felt need to use materials in emulsions that are naturally derived and can be easily recycled back into the environment without long-term adverse effects; corrugated cartons having wax-based coatings and adhesives, for example, are known to be difficult to recycle. Therefore, there is a need for employing a wax, which has similar properties of petroleum derived or synthetic waxes used in emulsion formulations. Due the large volume of waxes consumed in these applications it is also preferred that the compositions be readily available. From both a supply and a natural resource viewpoint, it is preferred that the compositions be obtained from a source that preferably is renewable, such as from plant extracts. Thus it is desirable to have a wax that does not have to be imported, and which can be produced at a cost that is competitive with that of petroleum-derived waxes, such as the paraffins and microcrystalline waxes.

There is a need for a wax that can be converted into anionic, cationic or nonionic emulsions, has a relatively high melting point, low viscosity, has good moisture barrier properties and is thermally stable. It is also desirable to have a wax that can be obtained from a renewable source, such as plants, rather than being petroleum based because of the previously discussed world's petroleum supply. The waxes used in the present invention meet these requirements.

The present invention relates to emulsions prepared using a vegetable wax comprising triglycerides, and having a melting point of from about 136-200 degrees F. (50-95 degree C.). These wax emulsions are used in a variety of applications including coating paper and wood, in polish and cosmetic applications, in inks, paints and adhesives; and in fruit coatings and in gypsum products to improve moisture resistance.

The present invention relates to a family of waxes derived by hydrogenating one or more vegetable oils. When hydrogenated to a high degree the properties of the oils are modified and become wax-like, having high melting points, low viscosities and good hardness. The waxes of the present invention are unique in that they also possess a high degree of functional groups. By modifying a portion of the functional groups on the present waxes they can be readily emulsified. Additionally it has unexpectedly been discovered that the waxes of the present invention can also be readily recycled due to the ability to further saponify the functional groups on the wax thereby rendering the wax more hydrophilic. Yet another unexpected discovery is the ability of the saponified waxes to help separate out inks and adhesive trash during the recycling process due to the relatively low density of the waxes and their ability to float and carry the ink, adhesive and trash with the wax.

The wax emulsions are comprised primarily of water, a surface-active agent (which will be either cationic, nonionic or anionic, depending upon the properties desired for the particular emulsion) and either an acid or a base (often chosen from KOH, NaOH, or one of a variety of amines. Other ingredients such as biocides or stabilizers may be added, as are well known to those versed in the art. Biocides, and/or antimicrobial agents may be added to the emulsion, the choice of a particular biocide or antimicrobial often being dependent upon the end use of the emulsion. Parabens such as methyl or ethyl hydroxy parabenzoic acid, or quaternary ammonium compounds, are among the biocides which may be used, other compounds being known to those skilled in the art. Because the waxes used in the preparation of the present invention are naturally occurring, readily available, generally regarded as safe and have relatively high melting points with good hardness and color, they can be used in lieu of less desirable synthetic waxes (often derived from petroleum, such as polyethylene) or in lieu of other less available naturally occurring waxes, such as, for example only, montan or carnauba.

Additionally, the waxes employed in the present invention can be readily removed from articles to which they have been applied, such as boxboard and paper. This removal is effected under what are considered to be normal conditions for paper recycling (dispersal in a warm alkaline aqueous mixture with agitation), because these waxes have been readily modified. Further, the present inventors have found that because of the relatively low density of the waxes employed in the present invention, that separation of inks and other trash during the paper recycling process are enhanced as the wax floats away from the paper, carrying inks and other recycling trash with it for easy skimming and removal in a paper recycling process. The ease of removal of these waxes from treated goods makes emulsions containing them suitable for use in textile applications where the lubrication and or sizing properties of the wax may be needed, such as in the process of fiber spinning and or fabric weaving, yet their removal is desirable at a later stage such as dying or de-sizing. The biodegradability of the novel waxes makes them particularly suitable for discharge to waste treatment plants capable of handling natural organic materials. Application of the novel wax emulsions to fruit has also been shown to have beneficial properties through their ability to reduce moisture loss and extend produce shelf life.

The present invention describes natural waxes which are used to formulate emulsions. The waxes are commercially available, high triglyceride waxes, derived from the processing of natural oil-containing commodities such as soybeans, palm, castor, canola and other crops from which oil can be obtained. Vegetable oils having differing degrees of hydrogenation are used in the food industry. For purposes of cooking oils, unsaturated oils are preferred. The highly hydrogenated waxes employed in the present invention, while commercially available, are not widely produced or used because of their limited applications in the food industries. The waxes used in the present invention are commercially available. Materials are processed and supplied by Archer Daniels Midland (Decatur Ill.) designated by their product number 86-197-0, Cargill Incorporated (Wayzata, Minn.) designated by their product number 800mrcs0000u and other sources under a generic name 'hydrogenated soybean oil'. Palm oil wax was supplied by Custom Shortenings & Oils (Richmond, Va.) and was designated as their product Master Chef Stable Flake-P. A mixture of hydrogenated castor oil and soy wax was also obtained from the Abitec Group (Columbus, Ohio, a blender and formulator of vegetable oil derived waxes), sold under the STEROTEX® trademark.

BRIEF SUMMARY OF THE INVENTION

It is an object of the present invention to provide a wax composition that can be formulated into water based wax emulsions.

Another object of the present invention is to provide a series of emulsions, prepared using vegetable derived waxes, that are stable.

Another object of the present invention is to provide a wax based emulsion which can be subsequently applied to articles such as paper, paperboard, linerboard, other cellulosic articles and the like, to render them moisture resistant for use in packaging for consumer and other industrial applications.

Still another object of the present invention to provide a composition that can be incorporated into wax based emulsion formulations as a substitute for petroleum-derived waxes currently used in many such formulations.

Another object of the present invention is to provide a composition that when incorporated into wax based emulsion formulations, is compatible with the other components of the formulations and forms a stable emulsion.

Still another object of the present invention is to provide a composition, which when formulated into an emulsion used for coating paper or other cellulosic goods, and which coating formulation is applied to an article for the purpose of rendering the coating moisture resistant, the coating has coating performance characteristics similar to that of a conventional wax based emulsion formulation prepared utilizing petroleum-derived wax.

Yet another object of the present invention is to provide a composition which can be derived from a renewable resource in place of non-renewable petroleum based compositions.

Still another object of the present invention is to provide a naturally-derived composition which is more economical to use, and thus can replace other naturally occurring, but more expensive and less available waxes, such as carnauba, in applications involving the coating of cellulosic goods and other products.

Still another object of the present invention is to provide a naturally-derived composition which is more economical to use, and thus can replace other naturally occurring, but more expensive and less available waxes, such as carnauba, in applications involving the coating of fruits in order to reduce moisture loss and extend the shelf life of produce.

Still another object of the present invention is to provide a composition which can be derived from a renewable resource and which can be economically produced.

Another object of the present invention is to provide a composition for use with food packaging and coatings and which has properties that are generally regarded as safe by the Food and Drug Administration.

The present inventors have unexpectedly discovered that highly hydrogenated oils such as palm and soybean can be converted into a wax that can be used effectively as substitutes for conventional petroleum and synthetic waxes in the formulation of wax based emulsion compounds.

The present invention comprises highly hydrogenated vegetable oils (derived from sources such as palm, soybean, corn, castor, canola or others) that have wax-like properties and which can be formulated into water emulsions using conventional methods of emulsification, to produce emulsions having barrier and coating characteristics similar to emulsion formulations containing petroleum-derived waxes. The inventive waxes, obtained from naturally derived, renewable resources, were emulsified under anionic, cationic and nonionic conditions, producing emulsions having a solids content up to about 45% solids. The soy and palm waxes consist essentially of a hydrogenated oil that comprises >90% triglyceride, and whose fatty acid components include palmitic acid and stearic acid, with stearic acid ($C_{18}$), being the most predominant (>50%). The castor wax, by contrast, contains about 1% stearic acid, ricinoleic acid being its major component (approximately 90%). The wax compositions have a low iodine value (between 2-5), and melting points between approximately 120-185 degrees F. (Mettler Drop Point). The wax compositions of the present invention can also be used as an additive (as a coating) in the manufacture of fibrous cellulosic products, such as wax coated boxes, which can then be recycled more readily than boxes prepared using conventional waxes. When used to coat fibrous cellulosic articles, such as paperboard, the emulsions' performance was similar to emulsions containing petroleum-derived waxes. The wax emulsions of the present invention can also be used by itself or in combination with other ingredients as a coating to reduce moisture loss or to increase the shelf life of foodstuffs such as fruits or other produce. The inventive waxes are used as an alternative to petroleum-derived, or more expensive naturally-occurring waxes in the manufacture of emulsions used in coatings, polishes, adhesives, paper products, paperboard and other manufacturing operations.

DETAILED DESCRIPTION OF THE INVENTION

The present invention relates to emulsions prepared using a wax composition derived from plants, which can be used as an alternative to waxes derived from petroleum. More particularly, the present invention describes wax to water emulsions, prepared with a wax composition derived from plants. Because the waxes used in the present invention can be economically produced from a renewable source, they can also substitute for certain naturally occurring, but more expensive to produce, waxes, coatings containing petroleum derived or synthetic waxes or properties from less available naturally occurring waxes such as carnauba (see Table 3), in various applications that will be described herein.

Naturally occurring and synthetic waxes are extensively used in a wide cross-section of industries including, for example but not limited to, cosmetics, foodstuffs, lubricants, personal hygiene, pharmaceuticals, and polishes for consumer and industrial use, such as floor polish. Additional uses include textile softening and sizing, fruit coating, water based inks and paints, coating of construction materials such as gypsum, particleboard, paper products such as corrugated cardboard, boxboard, linerboard, laminates, and fertilizer coating. The term wax is used to denote a broad class of organic ester and waxy compounds, which span a variety of chemical structures and display a broad range of melting temperatures. Often the same compound may be referred to as either a "wax," "fat" or an "oil" depending on the ambient temperature. By whatever name it is called, the choice of a wax for a particular application is often determined by whether it is a liquid or solid at the temperature of the product with which it is to be used. Frequently it is necessary to extensively purify and chemically modify a wax to make it useful for a given purpose. Despite such efforts at modification, many of the physical characteristics of waxes still prevent them from being used successfully or demand that extensive, and oftentimes, expensive, additional treatments be undertaken to render them commercially useable.

Triglycerides are fatty acid esters of glycerol. As will be used herein, the term "free fatty acid" will refer to a fatty acid that is not covalently bound through an ester linkage to glycerol. The term "fatty acid component" will be used to describe a fatty acid that is covalently bound through an ester linkage to glycerol.

Naturally occurring carboxylic acids ("fatty acids") and their derivatives, most commonly the glyceryl derivatives in which all three hydroxy groups of the glycerol molecule are esterified with a carboxylic acid, are used commercially. The carboxylic acids may be saturated or unsaturated. The trisubstituted glycerols (triglycerides, also referred to as triacylglycerols) are major components of most animal and plant fats, oils and waxes. When all three hydroxy groups of a glycerol molecule have been esterified with the same fatty acid, it is referred to as a monoacid triglyceride. Whether one refers to triglycerides as "waxes," "fats," or "oils" depends upon the chain lengths of the esterified acids and their degree of saturation or unsaturation as well as the ambient temperature at which the characterization is made. Generally, the greater the degree of saturation and the longer the chain length of the esterified acids, the higher will be the melting point of the triglyceride.

Many commercially utilized triglycerides and free fatty acids are obtained preferably from plant sources, including soybean, canola, cottonseed, corn, cranbe, linseed, palm, peanut, safflower, soy and sunflower oils. The triglycerides are used after they have been refined using methods known to those skilled in the art, such as, but not limited to, the solvent extraction of plant biomass using aliphatic solvents to obtain plant triglycerides. Subsequent additional purification may involve distillation, fractional crystallization, degumming, bleaching and steam stripping. The triglycerides obtained are partially or fully hydrogenated. Furthermore, fatty acids may be obtained by hydrolysis of natural triglycerides (e.g., alkaline hydrolysis followed by purification methods known in the art, including distillation and steam stripping) or by synthesis from petrochemical fatty alcohols. Free fatty acids, triglycerides and the like may also be obtained from commercial sources, such as Cargill, Archer Daniels Midland and Central Soya.

In the present invention. the free fatty acids and fatty acid components of the triglycerides are saturated, and have various chain lengths. The free fatty acids and fatty acid components of the triglycerides may be unsaturated, provided that the coating composition will be a solid at the temperature at which the coating is used. The properties of the free fatty acid/triglyceride mixture, such as melting point, varies as a function of the chain length and degree of saturation of the free fatty acids and the fatty acid components of the triglycerides. For example, as the degree of saturation decreases, the melting point decreases. Similarly, as the chain length of the fatty acids decreases, the melting point decreases. Preferred free fatty acids are saturated fatty acids, such as palmitic acid, oleic acid, stearic acid, arachidic acid and behenic acid. Stearic acid (a $C_{18}$ saturated fatty acid) is further preferred. Ricinoleic acid ((9Z,12R)-12-Hydroxy-9-octadecenoic acid) is a hydroxy, unsaturated $C_{18}$ fatty acid. Ricinoleic acid is the major component of castor oil and castor wax, which contain minor concentrations of oleic, linoleic and palmitic acids, as will be described further below.

The iodine value ("I.V."), also referred to as the iodine number, is a measure of the degree of saturation or unsaturation of a compound. The iodine value measures the amount of iodine absorbed in a given time by a compound or mixture. When used in reference to an unsaturated material, such as a vegetable oil, the IV is thus a measure of the unsaturation, or the number of double bonds, of that compound or mixture.

Vegetable oils or animal fats can be synthetically hydrogenated, using methods known to those skilled in the art, to have low or very low iodine values. Fats naturally composed primarily of saturated triglycerides (such as palm oil or fractionated fats) can be used alone or in blend formulations with adhesives/laminants to achieve an enhanced water tolerance for composite materials (U.S. Pat. No. 6,277,310). The major components of plant oils are triacylglycerols.

Saturated triglycerides having a low iodine value (ranging from iodine values of about 0-about 70, with an iodine value of about 0-about 30 being preferred) may be produced by hydrogenation of a commercial oil, such as oils of soybean, soy stearine, stearine, corn, cottonseed, rape, canola, sunflower, palm, palm kernel, coconut, crambe, linseed, peanut, fish and tall oil; or from fats, such as animal fats, including lard and tallow, and blends thereof. These oils may also be produced from genetically engineered plants to obtain low IV oil with a high percentage of fatty acids.

Fats are commonly fractionated by a process known as "winterization", wherein the mixture is chilled for a period of time which is long enough to allow the harder fractions of the fats to crystallize. This chilling is followed by filtration, with the harder fractions being retained on a filter cake. These harder fractions have a lower iodine value and, therefore, a melting point that is higher than the melting point of the fat from which it has been separated. Hence, winterization can also be used as a source for lower IV fats.

The winterization process is generally used to fractionate animal fats, and can thus produce a variety of animal fat fractions, having differing iodine values and consequently, differing chemical properties. These fractions can be blended with fatty acids and free fatty acids obtained from other sources, such as plant or vegetable extracts referred to above.

Wax based emulsions are routinely used in the manufacture of corrugated cartons, boxes and the like. They are also used in diverse areas, such as floor polish, textile softening and sizing, fruit coating, cosmetic formulations, water based inks and paints, gypsum manufacture and fertilizer coating. In many of these applications the moisture vapor barrier properties of the wax are critical to performance. It has been shown that the waxes of the present invention have comparable moisture vapor barrier properties to that of paraffin wax (See Table 5).

Emulsions are used at varying concentration and addition levels depending on the application. In fruit coating applications for example the wax may comprise a majority of the formulation that often also includes shellac to give gloss to the fruit. In paper applications, or for use with other fibrous cellulosic products, wax based emulsions can be used neat, i.e., without dilution, or may be diluted if incorporated into a coating or sizing formulation. The ionic charge that is desirable is usually related to the application. In textiles, for example, cationic wax emulsions have a greater affinity to the fiber or fabric than anionic or non-ionic emulsions, and cationic emulsions are generally used to aid in wax pick up of the fiber/fabric. Surfactants, or surface-active agents, also called emulsifiers, can include nonyl phenol ethoxylates and other ethoxylates available from commercial suppliers. Examples include alcohol ethoxylates, alkylamine ethoxylates, alkylphenol ethoxylates, octylphenol ethoxylates and the like. Other surfactants, such as a number of fatty acid esters may be employed; for example, but not limited to, glycerol esters, polyethyleneglycol esters and sorbitan esters and also amidated fatty esters such as tallow amine.

Nonionic surfactants which can be employed include nonylphenyl ethoxylates, such as sold under the IGEPAL® trademark (Rhodia, Inc., Cranbury N.J.), such as IGEPAL®CO-630 (CAS No. 68412-54-4) or POLYSTEP® F-3 (Stepan Co., Northfield, Ill.); alkylphenol ethoxylates; octylphenol ethoxylates, such as IGEPAL® CA series compounds; decyl phenol ethoxylates; oleyl alcohol ethoxylates; NONIDET NP-40 (CAS No. 9016-45-9) and the like. TOMADOL® 25-3/25-9 combination to HLB 10.5 (Tomah Chemical Corp. Milton, Wis., a mixture of ethoxylated linear alcohol nonionic surfactants) or TERGITOL® 15-S-5/15-S-9 combination to HLB 10.5 (Dow Chemical, Midland Minn.) are other nonionic surfactants which may be employed.

Generally, the surfactant to be used will have a specific range of HLB values, and other surfactants with similar properties can be substituted therefor.

Cationic surfactants include imidazolines, diethyl amine, or ethoxylated amines, such as tallow amine TAM-5 or TAM-15. The surfactant to be used will have a specific range of HLB values, and other surfactants with similar properties can be substituted therefor.

Certain surfactants, used for removal of ink from paper, include those of the ANTAROX® (Rhodia Inc., Cranbury N.J.) group. These compounds include nonionic dispersants, ethylene oxide-propylene oxide copolymers, nonylphenol-ethylene oxide-propylene oxides, and poloaxomers. Companies such as ONDEO Nalco of Naperville, Ill. also supply custom blended surfactants tailored to meet the ink removal and repulping needs of specific customers.

The present invention relates to emulsions prepared using a vegetable wax comprising triglycerides, and having a melting point of from about 136-200 degrees F. The present invention employs a hydrogenated triglyceride where the iodine value is close to zero thereby rendering the triglyceride more thermally stable. The triglycerides can be chosen from those having an iodine value of between 0-30, but a triglyceride having an iodine value of between 2-5 is preferred.

The wax emulsions are comprised primarily of water, a surface-active agent (which will be either cationic, nonionic or anionic, depending upon the properties desired for the particular emulsion) and either an acid or a base (often chosen from KOH, NaOH, or one of a variety of amines, as previously described.

Other ingredients such as biocides or other stabilizers can be added to the emulsions, and these agents are known to those skilled in the art. Biocides, and/or antimicrobial agents may be added to the emulsion, the choice of a particular biocide or antimicrobial often being dependent upon the end use of the emulsion. Parabens such as methyl or ethyl hydroxy parabenzoic acid, or quaternary ammonium compounds, are among the biocides which may be used, other compounds are known to those skilled in the art. Buffering agents and thickeners, also known to those skilled in the art, may be added to the emulsions of the present invention. Common preservatives such as formaldehyde are sometimes used and the subject of regulatory agencies such as the Food and Drug Administration and Environmental Protection Agency.

Because the waxes used in the preparation of the present invention are naturally occurring, readily available, generally regarded as safe and have relatively high melting points with good hardness and color, they can be used in lieu of less desirable synthetic waxes (often derived from petroleum, such as polyethylene) or in lieu of other less available naturally occurring waxes, such as, for example only, montan or carnauba.

The present invention is a natural wax for use in wax based emulsion formulations. The product is a commercially available high triglyceride wax derived from the processing of natural oil-containing commodities such as soybeans, palm, castor, canola and other crops from which oil can be obtained. The waxes used in the present invention are a palm oil wax and a soybean wax and combinations of these with castor wax prepared from hydrogenated oil. The materials are processed and supplied by Cas Chem (Bayonne, N.J.), Archer Daniels Midland (Decatur Ill.) designated by their product number 86-197-0; Cargill Incorporated (Wayzata, Minn.) designated by their product number 800mrcs0000u; and other sources under a generic name 'hydrogenated soybean oil'. Palm oil wax was supplied by Custom Shortenings & Oils (Richmond, Va.) and was designated as their product Master Chef Stable Flake-P. The soybean wax is also distributed by Marcus Oil and Chemical Corp., Houston, Tex. under the designation Marcus Nat 155; these waxes can also be used as food additives.

The properties of the soy and palm waxes are summarized in Tables 1 and 2, where it can be seen that these waxes have IV's of between 5 and 2, respectively.

The soybean oil wax has a melting point, as measured by Mettler Drop Point, of between 155-160 degrees F., while that of the palm oil wax is between 136-142 degrees F.

The palm and soy waxes are further characterized by having a viscosity of between 10-200 cps at a temperature of 210 degrees F., The palm and soy waxes each comprise 98% triglyceride by weight with trace amounts of fatty acids. The triglyceride can be saponified through the addition of a base such as KOH to yield a saponification value. Saponification values will vary depending mainly upon the chain length of the fatty acid, which itself is a function of the source of the vegetable wax. For hydrogenated soy and palm wax the saponification value is usually in the 180-200 mg KOH/g range (Tables 1 and 2).

When the palm and soy waxes were analyzed for their fatty acid content using known methods of Gas Liquid Chromatography ("GLC"), the soybean wax was found to comprise between 82-94% stearic acid ($C_{18:0}$) and between 3-14% palmitic acid ($C_{16:0}$). By comparison, the palm oil wax comprises approximately 55% stearic acid ($C_{18:0}$), 39.5% palmitic acid ($C_{16:0}$), 1.1% myristic acid ($C_{14:0}$) and approximately 1.0% oleic acid ($C_{18:}$).

Castor wax is derived from castor oil in much the same was as the soy and palm waxes are prepared from their respective oils. Castor oil is a natural oil obtained from the seed of the castor plant. It is unique among all fats and oils in that it is the only commercially important oil comprised of approximately 90% ricinoleic acid ((9Z,12R)-12-Hydroxy-9-octadecenoic acid, a hydroxy, unsaturated $C_{18}$ fatty acid having a double bond in the 9-10 position and a hydroxyl group on the 12th carbon). The fatty acid composition of castor oil is described as 87% ricinoleic acid, 7% oleic acid, 3% linoleic acid, 2% palmitic acid, 1% stearic acid, and trace amounts of dihydrostearic acid (The Merck Index, 13th edition, 2001, Merck & Co. Inc, Whitehouse Station N.J.). India, China and Brazil are the primary sources of castor oil. Scientific and historical records reveal that regardless of origin, its chemical nature and composition are remarkably uniform.

Castor wax, also referred to as hydrogenated castor oil, is catalytically hydrogenated castor oil (hydrogenation of castor oil in the presence of a nickel catalyst). Castor wax is a hard, brittle wax that is extremely insoluble in water and in commonly used organic solvents, known to those skilled in the art. The wax has a melting point of about 84-88 degrees C. (approximately 183-185 degrees F.), and is characterized by having an acid number of 2-3 (mg KOH/g), a saponification number of about 174-186 (mg KOH/g), and an iodine number of 3-4 (Table 3).

Castor wax has been used in the preparation of coatings that are either water-repellant, or resistant to oils, petroleum and petroleum derivatives. While a major use of castor wax is in manufacturing greases, it is also used in paper coatings for food packaging and cosmetic applications, and derivatives of castor wax are used as surfactants and plastics additives. Note the difference in stearic acid contents among these waxes, the palm and soy waxes having between 84-92% stearic acid, while about 1% stearic acid is present in castor wax.

Although the present invention has been described with a certain degree of particularity, it is to be understood that the examples below are merely for purposes of illustrating the present invention, the scope of the present invention intended to be defined by the claims.

PREPARATION OF EXAMPLES

Example 1

Preparation and Evaluation of Nonionic Emulsions Comprising Soy Wax and Prepared Using a Homogenizer For the purpose of illustrating the invention a nonionic emulsion was prepared utilizing Marcus Nat 155 Wax (Soybean wax). The emulsion was prepared using two atmospheric vessels, one to melt the wax and emulsifiers blend and the other to heat the water to temperature. Once melted and the water brought up to temperature, the wax-emulsifiers blend is combined with the heated water at the appropriate temperature. The mixture is homogenized using an APV/Goullin Homogenizer, an apparatus that is typically used in both the chemical and dairy industries. After homogenizing, the product can be cooled by a heat exchanger or other vessel. The homogenizer allows for more aggressive mixing and a higher solids emulsion than can be obtained using standard mixing techniques.

| Ingredients | addition (grams) | | |
| --- | --- | --- | --- |
| Marcus NAT 155 Wax (Soy) | 20.0 gm | 30.0 gm | 40.0 gm |
| Nonionic Surfactant (Target HLB 11.0-12.0) | 5.0 gm | 5.0 gm | 5.0 gm |
| Potassium Hydroxide (45% KOH) | 0.01 gm | 0.01 gm | 0.01 gm |
| Water to | 25% solids | 35% solids | 45% solids |

Procedure
1) Charge water and set agitation for good movement without vortex.
2) Heat water charge to 70-80 degrees C.
3) Charge Marcus NAT 155 Wax
4) Add Nonionic Surfactant.
5) Add Potassium Hydroxide (45% KOH).
6) Hold the mixture at 70-80 degrees C. for 30 minutes.
7) Maintain agitation and cool to 50 degrees C.
8) Discharge through homogenizer set at 3000 psi (secondary 500/primary 2500)
(Note that the emulsion temperature and viscosity will be increased during discharge from the homogenizer).
9) Cool material to 30-35 degrees C. by use of a heat exchanger or a second vessel (Viscosity of emulsion will be reduced by cooling to 30-35 degrees C.).

In this Example, the nonionic surfactant employed was IGEPAL® CO-630 (Rhodia Inc, Cranbury, N.J.). The surfactants are chosen such that the surfactant possesses an HLB in the range of 11-12, or as indicated as the "target HLB". The HLB properties of surfactants are known to those skilled in the art, and will not be discussed further. Therefore, other surfactants having the desired characteristics can be used instead of IGEPAL® CO-630. Examples of such alternate surfactants have been described previously in this specification.

The resulting emulsions were milk colored and stable. When viewing the emulsion on a glass slide it appeared uniform to the eye, and only minor amounts of non-emulsified wax particles were observed.

Example 2

Preparation and Evaluation of Cationic Emulsions Comprising Soy Wax

For the purpose of illustrating the invention a cationic emulsion was prepared utilizing Marcus Nat 155 Wax (Soy-based). The emulsion was prepared using two atmospheric vessels, one to melt the wax and emulsifiers blend and the other to heat the water to temperature. Once melted and the water brought up to temperature, the wax-emulsifiers mixture is combined together with the heated water at temperature. This technique for emulsification is commonly known to those versed in the art as a wax to water technique, and utilizes a standard mixing technique to prepare the emulsion The reagents used were:

| | |
|---|---|
| Marcus NAT 155 Wax (Soy) | 30.0 gm |
| Cationic Surfactant | 7.5 gm |
| Tallow Amine Ethoxylate (TAM-5) | |
| Glacial Acetic Acid | 1.9 gm |
| Water | 61.6 gm |
| Final water charge to | 35% Solids |

Procedures
1) Melt Marcus 155 Wax, cationic surfactant at 60-70 degrees C.
2) Heat $1^{st}$ water charge to 55-65 degrees C.
3) After $1^{st}$ water charge is at temperature, add Glacial Acetic Acid to the melt from step 1.
4) Transfer molten wax, cationic surfactant and acid mixture to heated water.
5) After all material is transferred, mix 30 minutes.
6) Cool to 30-35 degrees C.
7) Add water to achieve a final concentration of 35% solids.

The resulting emulsions were milk colored and stable. When viewing the emulsion on a glass slide it appeared uniform with only minor amounts of non emulsified wax particles observed.

Example 3

Preparation and Evaluation of Nonionic Emulsions Comprising Soy Wax

For the purpose of illustrating the invention a nonionic emulsion was prepared utilizing Marcus Nat 155 Wax (Soy-based). The emulsion was prepared using two atmospheric vessels, one to melt the wax and emulsifiers blend and the other to heat the water to temperature. Once melted and the water brought up to temperature, the wax-emulsifiers mixture is combined together with the heated water at temperature. As in Example 2, this technique for emulsification is commonly known to those versed in the art as a wax to water technique Ingredients

| | |
|---|---|
| Marcus NAT 155 Wax (Soy) | 20.0 gm |
| Nonionic Surfactant (Target HLB 10.5) | 5.0 gm |
| Potassium Hydroxide (45% KOH) | 0.05 gm |
| Water to | 25% Solids |

Procedures
1) Charge water and set agitation for good movement without vortex.
2) Heat water charge to 70-80 degrees C.
3) Charge Marcus NAT 155 wax.
4) Add Nonionic Surfactant.
5) Add Potassium Hydroxide (45% KOH).
6) Hold at 70-80 degrees C. for 30 minutes.
7) Cool to 30-35 degrees C. as soon as possible and maintain good agitation.

In this Example, the nonionic surfactant used was IGEPAL® CO-630 (Rhodia). The resulting emulsions were milk colored and stable. When viewing the emulsion on a glass slide it appeared uniform with only minor amounts of wax particles observed.

Example 4

Preparation and Evaluation of Cationic Emulsions Comprising a Soy Wax and Castor Wax Blend Certain end use applications, such as floor polishes, textiles, coatings and inks, for wax emulsions often require the wax emulsions to be made with a wax having a higher melting point than waxes used in applications such as cosmetics. For the purpose of illustrating the invention, a cationic emulsion was prepared utilizing Marcus NAT 180 Wax, which is a blend of 30% castor wax and 70% soy wax. The castor and soy waxes were prepared by hydrogenating castor oil and soy oil to a low iodine value similar to the soy wax preparations already described herein. The blended castor and soy wax is characterized by the following properties:

| | |
|---|---|
| Acid Value | 1.0 max mg/g |
| Iodine value | 5.0 max cg/g |
| Melt point | 180-185 F. (82-85 C.) |
| Saponification Value | 185-195 (mg/g) |

The material as described above is also available from Abitec Performance Products under the trademark STEROTEX® K and is typically used in the pharmaceutical industry to coat tablets.

The emulsion was prepared using two atmospheric vessels, one to melt the wax and emulsifiers blend and the other to heat the water to temperature. Once melted and the water brought up to temperature, the wax/emulsifiers/alkali is combined together with the water at temperature. This technique for emulsification is commonly known to those versed in the art as a wax to water technique

| Ingredients | 1 | 2 |
|---|---|---|
| Marcus NAT 180 Wax | 30.0 gm | 30.0 gm |
| Cationic Surfactant | | |
| Tallow Amine Ethoxylate (TAM-5) | 7.5 gm | |
| Tallow Amine Ethoxylate (TAM-15) | | 7.5 gm |
| Glacial Acetic Acid | 1.9 gm | 1.9 gm |
| Water | 61.6 gm | 61.9 gm |
| Final water charge to | 35% Solids | 35% Solids |

Procedures
1) Melt Marcus NAT 180 Wax, and the cationic surfactant, at 85-90 degrees C.
2) Heat $1^{st}$ water charge to 90-95 degrees C.
3) After $1^{st}$ water charge is at temperature, add Glacial Acetic Acid to the melt from step 1.
4) Transfer molten wax, cationic surfactant and acid mixture to heated water.
5) After all material transferred, mix 30 minutes.
6) Cool to 30-35 degrees C.
7) Add sufficient water to adjust the solids content to 35% solids.

The resulting emulsions were milk colored and stable. When viewing the emulsion on a glass slide it appeared uniform with only minor amounts of wax particles observed.

Example 5

Preparation and Evaluation of Nonionic Emulsions Comprising a Soy Wax and Castor Wax Blend Nonionic emulsions are extremely versatile due to their wide range of compatibility and the availability of readily available and relatively innocuous surfactants with which they can be prepared. To test whether a blend of vegetable oil derived waxes could be emulsified in a nonionic formulation, the soy-castor wax formulation, described in Example 4, was formulated into an emulsion as follows:

| Ingredients | |
|---|---|
| Marcus NAT 180 Wax | 20.0 gm |
| Nonionic Surfactant (Target HLB 10.5) | 5.0 gm |
| Potassium Hydroxide (45% KOH) | 0.05 gm |
| Water to | 25% Solids |

Procedures
1) Charge water and set agitation for good movement without vortex.
2) Heat water charge to 90-95 degrees C.
3) Charge Marcus NAT 180 wax.
4) Charge Nonionic Surfactant(s).
5) Charge Potassium Hydroxide (45% KOH).
6) Hold mixture at 90-95 degrees C. for 30 minutes.
7) Cool to 30-35 degrees C. as soon as possible and maintain good agitation.

In this Example, the nonionic surfactant employed was IGEPAL® CO-630 (Rhodia).
Among the other nonionic surfactants that could be utilized include:

TOMADOL® 25-3/25-9 combination to HLB 10.5 (Tomah Chemical Corp.) or
TERGITOL® 15-S-5/15-S-9 combination to HLB 10.5 (Dow Chemical, Midland Mich.).

The resulting emulsions were milk colored and stable. When viewing the emulsion on a glass slide it appeared uniform with only minor amounts of wax particles observed.

Example 6

Preparation and Evaluation of Nonionic Emulsions Comprising a Soy Wax and Castor Wax Blend and Prepared Using a Homogenizer The use of a homogenizer (as used in Example 1) for the preparation of an emulsion generally allows for a higher solids loading of the emulsion than can be obtained using conventional stirring techniques, such as those employed in Examples 4 and 5 above. To test whether a stable emulsion could be prepared using a blend of castor and soy waxes, an emulsion was prepared as follows:

| Ingredients | | | |
|---|---|---|---|
| Marcus NAT 180 Wax | 20.0 gm | 30 gm | 40 gm |
| Nonionic Surfactant (Target HLB 11.0-12.0) | 5.0 gm | 5 gm | 5 gm |
| Potassium Hydroxide (45% KOH) | 0.01 gm | 0.01 gm | 0.01 gm |
| Water to | 25% solids | 35% solids | 45% solids |

Procedure
1) Charge water and set agitation for good movement without vortex.
2) Heat water charge to 90-95 degrees C.
3) Charge Marcus NAT 180 Wax.
4) Charge Nonionic Surfactant(s).
5) Charge Potassium Hydroxide (45% KOH).
6) Hold at 85-90 degrees C. for 30 minutes.
7) Maintain agitation and cool to 50 degrees C.
8) Discharge through homogenizer set at 3000 psi (secondary 500/primary 2500)
(Note emulsion temperature and viscosity will be increased).
9) Cool material to 30-35 degrees C. by use of heat exchange or second vessel
(Viscosity of emulsion will be reduced by cooling to 30-35 degrees C.).

In this Example, the nonionic surfactant used was IGEPAL® CO-630 (Rhodia) The resulting emulsions were milk colored and stable. When viewing the emulsion on a glass slide it appeared uniform with only minor amounts of wax particles observed.

Example 7

Moisture Vapor Transmission Rate ("MVTR")

Moisture transmission is an important property of wax-based coatings. The MVTR indicates how rapidly moisture would penetrate the wax coating and degrade the properties of the substrate. It is desirable to have a low MVTR in cartons containing produce, where excessive moisture would cause spoilage of the fruits or vegetables. Poultry is often shipped in freezer boxes, which are generally wax coated corrugated boxes (kraft paper coated with wax) that are packed with poultry (or other food item) and then rapidly chilled, often by immersion in a ice/water bath. If the paper were not protected from the water, the strength of the box would degrade, making the use of these kinds of boxes impractical.

In this experiment MVTR was tested by a modified ASTM D3833 method. The modification required the use of clamps to assure adhesion of the linerboard to the aluminum cup.

Coatings were made using a wet film applicator (Bird type) with a 1.5 to 5 mil gap depending on the viscosity of the test wax. The coating, the 4 inch wide applicator and sheets of ½ inch thick plate glass were placed into a 200 to 250 degrees F. oven for 10-15 minutes. The glass was removed from the oven and strips of the linerboard (unbleached kraft paper, as known to those skilled in the art) were placed onto the glass. A volume of the specific coating was placed at one end of the linerboard, the applicator applied to the linerboard and the hot molten coating drawn by hand to coat the linerboard, which was then allowed to solidify at ambient temperature. Each sample was tested to assure a coat weight in the range of 5.6 to 6.2 lb $1/1000$ square feet.

The results are summarized in Table 5, which illustrates that while the coating weights were comparable; the soybean oil wax composition resulted in MVTR levels comparable to that of the control preparation. Although the evaluations were not conducted with application of the wax as an emulsion, the results are indicative of the ability of the wax coating to reduce moisture transmission.

Example 8

Evaluation of Emulsions Comprising Vegetable Wax as a Fruit Coating

Wax emulsions are often used to coat food products to reduce their moisture loss during transportation, storage, and delivery to the ultimate consumer, and thus help preserve products, such as citrus fruit. To test the novel emulsion's effectiveness in reducing moisture loss in citrus fruit, an emulsion was prepared according to the following formulation and procedure, the emulsion then used to coat fruit, which was subsequently monitored for weight loss over a period of time.

Fifteen (15) grams of Marcus Oil & Chemical (Houston, Tex.) NAT 155 Wax (soy wax) was placed in a 400 ml SORVALL® (Norwalk, Conn.) stainless steel chamber and melted on an electric hot plate until clear. To the molten wax was added 1 gm of POLYSTEP® F-5 nonylphenol ethoxylated (12 moles Ethylene Oxide) (Stepan Company Northfield, Ill.) and 1 gm of a 30% KOH solution. The mix was kept molten and agitated for 30 min. Separately, 50 gm tap water was heated to boiling. The boiling water was added to the hot molten wax mixture and immediately inserted into a SORVALL® Omni-mixer homogenizer equipped with a SORVALL® model no. 17183 rotor-knife agitator. The mixer speed was set to 0.5. After 1 min 30 sec. the chamber was placed in cold tap water and allowed to cool while still under agitation. Following cooling to ambient temperature the resulting emulsion appeared fluid and opaque. This emulsion was designated Soy Wax Emulsion #1.

Twenty-three (23) grams of Soy Wax Emulsion #1 was added to 230 grams of tap water and mixed until uniform. This diluted emulsion was designated as Coating #1. Citrus fruit, specifically lemons, were purchased from a local vendor. Three of the lemons were then immersed in Coating #1 for 30 seconds, then removed and placed atop beakers where they were allowed to dry. After 8 hours, three uncoated lemons, designated as Untreated Control Lemons and the three coated lemons, designated as Treated Lemons, were weighed and this weight was designated as the initial weight (WI) for the experiment.

Figure 1:
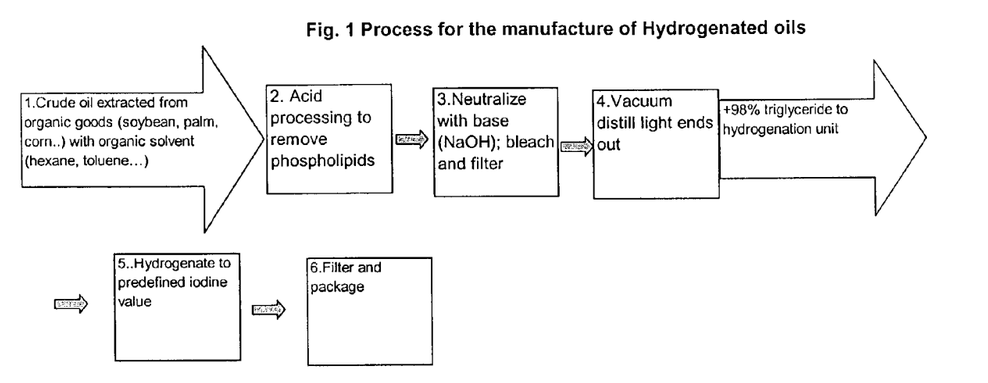
FIG. 1 is a flow chart illustrating a process for the manufacture of hydrogenated oils.
Figure 2:
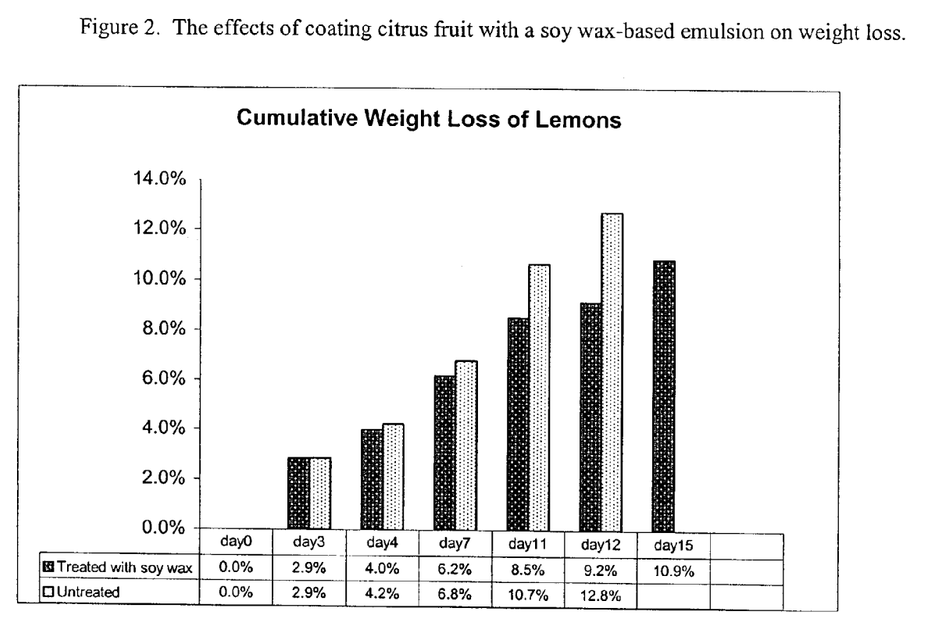
FIG. 2 illustrates the effects of coating citrus fruit with a soy wax-based emulsion on weight loss.

The lemons were placed in a cool (temperature between approximately 65-70 degrees F.) dry room and weighed periodically. The average results for the three Untreated Control and three Treated Lemons are shown in FIG. 2. After 12 days the Untreated Control Lemons showed signs of spoilage and were no longer weighed. The Treated Lemons showed no signs of spoilage after 15 days, whereupon the experiment was terminated. The weight of each lemon during this period was recorded, and designated as WX, where X is the weight of the lemon on a particular day. The difference between the experimental weight (WX) and the initial weight (WI) was the weight loss, which was then calculated as a percent of the initial weight, and the percent of weight loss plotted as a function of time.

The data in FIG. 2 shows that the novel emulsion was able to reduce moisture loss of the Treated Lemons from 12.8% to 9.2%, thereby effecting a 28% reduction in weight loss.

Example 9

Repulping Tests

To test the feasibility of repulping the wax-coated paper samples, one and one half liter (1.5l) of hot (approximately 120 degrees F.) tap water was placed in the chamber of an OSTERIZER® Model 6641 Blender (Registered Trademark of Sunbeam Corp. Ft. Lauderdale, Fla.). To this was added 3.98 grams of sodium carbonate. The blender was set on low speed and run for one minute to dissolve the sodium carbonate. The aqueous solution had a pH of approximately 10. Then 5 grams of wax coated linerboard sample (prepared as described in Example 7 above) was added to the water. The blender was run for ten minutes and then stopped briefly to determine whether sample pieces had stuck to the sides of the lid, and if so, such pieces were removed from the lid, and added back to the water in the blender. The blender was then turned back on for an additional 10 minutes to complete the blending cycle. Immediately upon completion, 500 ml was poured off and diluted with an additional 500 ml of hot (approximately 120 degrees F.) water. The diluted solution was poured into a quart jar. The samples were then subjectively compared to the Control Wax sample (Control wax used was CITGO BLEND-KOTE® 467, a paraffin wax derived from petroleum, CITGO Petroleum Corporation, Tulsa, Okla.), the number and size of particles present in the liquid being determined as described in Table 4.

The results of this evaluation are shown in Table 4. The Marcus Oil palm wax had the best repulping results, the linerboard sample treated with it producing almost no particles evident and the coating all but disappearing into the repulping solution. The MVTR of this preparation (Table 6), although higher than the control, is considered low and within the acceptable range for most food packaging applications.

The soybean wax sample produced fewer small particles than the control wax but many more particles than the palm wax in the repulping experiment. The CITGO control wax, as expected, had a very large number of small particles evident.

Although the repulping tests in this Example were conducted using a molten wax, the results are indicative of results that would be achieved had the coating been applied in the form of an emulsion (as will be shown in Example 10, below).

Example 10

Repulping and Wet Strength Testing of Emulsion-Coated Paperboard

Samples of corrugated paperboard were obtained, coated with a soy wax emulsion, and the repulpability of the emulsion-coated paperboard was determined.

The test emulsion was prepared using the following formulation:

| Ingredient | |
|---|---|
| Marcus Nat 180 Wax (mixture comprising 70% hydrogenated soy wax and 30% hydrogenated castor oil wax). | 10 gm |
| POLYSTEP ® F-3 ethoxylated nonyl phenol surfactant (Stepan Chemical, Chicago, IL) | 2.5 gm |
| KOH (50% solution) | 0.025 gm |
| Water | 50 gm. |

The wax was melted by immersion in a water bath set to 205 degrees F., the emulsion prepared by adding the KOH solution, surfactant and 50 grams of hot water into a SORVALL® Mixer (mix speed set to 2) and agitating for 15 min followed by rapid cooling in a tap water bath while continuing to agitate. The resultant emulsion was a stable, pourable milky emulsion. POLYSTEP® F-3® is a nonionic surfactant having an HLB in the range of 10-12.

Paperboard, specifically a corrugated box (200# 'C' flute, Kraft corrugated with edge crush of 32 lb/in) was cut into pieces, each piece being 3 cm by 8 cm, and the pieces weighed. The weighed pieces were dried in an oven set at 90 degrees C. for 30 min to dry.

Six pieces (three designated A, treated and three designated C, control) were dipped in the emulsion for 5 min. The pieces appeared completely saturated. Three other pieces of paperboard (designated B, untreated) were kept as untreated samples. The six treated pieces (A and C) were removed from the emulsion and were allowed to drain. All samples were placed into an oven set to 90 degrees C. for 1 hour. Weights were recorded as follows:

| Sample | Initial Weight | Weight after Drying corrugated | Weight after applying emulsion & Dry | Wax Pick Up |
|---|---|---|---|---|
| A - treated | 4.3 g | 4.0 g | 4.9 g | 0.9 g |
| B - untreated | 4.1 g | 3.8 g | blank | 0.0 g |
| C - control | 4.1 g | 3.7 g | 4.5 g | 0.8 g |

To replicate repulping conditions, each of the dried samples were mixed with 80 ml tap water, 3 ml POLYSTEP® F-3 and KOH added to produce a pH of approximately 9. The samples were heated to 60 degrees C. and mixed in a SORVALL® mixer set to #3 speed for 5 min. Each sample was filtered through a paper filter (20 micron pore size), rinsed with warm tap water (3 rinses, each rinse approximately 200 ml). The rinsed pulp was placed in an oven at 90 degrees C. for 8 hr to dry.

Once dried, 3 gm of pulp from each sample was taken and mixed with 40 ml of xylene (a known solvent for Marcus NAT 180 wax). The xylene soaked pulp was placed in an oven at 80 degrees C. for 30 min and then mixed well and allowed to settle for 30 min. Thirteen (13) gm of supernatant xylene was decanted from each beaker, placed in a weighed beaker, then on a hot plate and the solvent allowed to volatize. The Control samples (samples of emulsion coated corrugated paperboard) were prepared and put through xylene extraction without first having been repulped.

The results, shown below, indicate that the wax was removed from the paper as a result of the washing with warm alkaline water and surfactant. The control indicates the approximate amount of wax that would have been present had it not been removed in the repulping process.

| SAMPLE | Residual after drying |
|---|---|
| A - treated (wax) | 0.1 g |
| B - untreated (no wax) | 0.1 g |
| C - Control (wax) | 0.3 g |

The treated samples were observed to be noticeably stiffer than the untreated samples. To test whether the emulsion coating affected the wet strength properties of corrugated board, additional treated and untreated samples were prepared as described in this Example above, but not subjected to the repulping conditions. All samples were immersed in room temperature water for 1 min, the samples then placed on a scale and a ⅜ inch diameter rod placed perpendicular to the paper and the force needed to crush the corrugated board was measured.

The results, shown below, indicate that the novel emulsions aid in increasing the crush strength for wet corrugated board.

| Sample | Crush strength (grams) |
|---|---|
| Treated | >1000 |
| Untreated | 100-120 |

Example 11

Repulping of Wax and Newsprint

The paper stock used in this evaluation was the US News, a paper known in the industry to be manufactured using a high percentage of secondary fiber. Because the paper is manufactured using a high content of recycled paper, wax-coated paper stock is often mixed with uncoated paper stock. Unless the wax is removed, the wax causes problems in the reprocessed paper. Among the problem are spotting of the paper, and effects on the gloss, and printability of the paper.

The following evaluation shows that the waxes of the present invention can be readily dispersed under normal repulping conditions and also illustrate the additional benefit resulting from saponifying the triglyceride wax into a soap, thereby further aiding repulping.

A 10% solids paper solids stock (10 gm paper and 90 gm water) was made by using a high-speed mixer. This paper stock was used as the control pulp stock. A series of mixtures was prepared by adding either an emulsion prepared with one of the vegetable waxes, or by addition of a surfactant known to be effective in removing ink from paper. The emulsions or surfactant were added to a concentration of either 0.5% or 1.0%, based on the weight of the bath (i.e., based on the total weight of the paper stock). Each emulsion was added from a product comprising 30% active, while the surfactant was added from a stock comprising 45% actives (ethylene oxide and propylene oxide).

The following mixtures were made and evaluated for ink removal:
A. Control (no additives),
B. 1.0% Marcus NAT 155 (Soy wax) Direct Emulsion product comprising 30% solids (final concentration of actives=0.3%).
C. 0.5% Marcus NAT 155 (Soy wax) Direct Emulsion product comprising 30% solids (final concentration of actives=0.15%).
D. 1.0% Marcus NAT 180 (Soy wax-castor oil wax blend) Direct Emulsion product comprising 30% solids (final concentration of actives=0.3%).
E. 0.5% Marcus NAT 180 (Soy wax-castor oil wax blend) Direct Emulsion product comprising 30% solids (final concentration of actives=0.15%).
F. 1.0% De-inking Surfactant (45% actives, Ethylene oxide and propylene oxide).

In this Example, the de-inking surfactant was Nalco DI2221, a propylene oxide alcohol ethoxylated supplied by ONDEO Nalco of Naperville, Ill. This surfactant had been developed specifically for deinking applications. The mixtures were stirred for 10 minutes. As will be described further in this Example, the mixtures containing emulsions prepared with the waxes necessitated adjusting the pH of the reaction mixture to pH 7.5 to 8.0, using a sodium hydroxide solution. The paper slurries were then washed to float the ink off of the paper, and the paper samples examined for whiteness using the Hunter Whiteness scale, as known to those skilled in the art.

The results, shown below, indicate that both of the NAT waxes outperformed the de-inking surfactant (Nalco DI2221) at the lower concentrations (0.5%). However, samples made with the NAT 180 wax (70% hydrogenated soy wax and 30% hydrogenated castor wax) required the processing temperature to be raised to 160-175 degrees F. to improve the solubility of the base wax.

| SAMPLE | Whites Numbers (Hunter Whiteness) |
|---|---|
| Control | 41 |
| 0.5% NAT 155 | 63 |
| 0.5% NAT 180 | 64 |
| 1.0% NAT 155 | 65 |
| 1.0% NAT 180 | 62 |
| De-Inking Surfactant | 52 |

A second series of experiments was performed to determine if the NAT waxes performed better than the control de-inking surfactant because of a greater rate of ink removal from the paper. In this experiment, samples containing the inventive wax compositions effected ink removal within the first 5 minutes of processing compared to the de-inking surfactant (Nalco DI2221) which required 8 minutes of processing to obtain its' best results.

The emulsions used in the mixtures described above were prepared with emulsions made using a pH of 6-7 during the emulsification process.

An emulsion was prepared using the Marcus NAT 155 (Soy) using a pH of approximately 7.8 during the emulsification process, and a sample of this emulsion tested for its ability to remove ink from newsprint as described earlier in this Example. These data showed the best results were obtained using an emulsion which was prepared with the process pH between 6.0-7.0, and adding alkali during the de-inking slurry process to adjust the pH to 7.5-8.0.

Example 12

Effects of pH and Temperature on Repulpability of Paper Stock

In this Example, a stock paper with no finish applied was employed (a finish is a starch and or starch and clay based coating typically applied to writing paper). The paper stock is commonly referred to in the gift-wrapping industry as #1 white wrapping tissue and has a basis weight of 10 lbs per 1000 square feet of paper. Its source was Federal Paper Board Company, Inc., (Montvale, N.J.).

Replicate samples of this paper stock were treated with an emulsion prepared with the Marcus NAT 180 (soy wax-castor oil wax blend, comprising 30% solids and prepared using IGEPAL® CO-630 nonionic surfactant), such that the samples had a final concentration of 0.5%, 1.0%, and 1.5% add-on of solids. No additional surfactant was added to the repulped mix and the pH for the samples measured between 7.5 and 8.0. The coated paper stock was air dried at 250 degrees F. After drying, the coated paper stock was re-pulped using a high-speed blender, and compared with a control sample of untreated stock.

The results of this study showed that samples treated with the lower level (0.5%) of wax achieved a pulp at a normal viscosity within 20 minutes, compared to the control (untreated paper stock) that required 42 minutes. Sodium hydroxide was added to raise the pH to 7.5-8.0, and no additional heat was applied. A process temperature of 170-180 degrees F. was achieved, the heat being generated from the high speed mixing of the reaction mixtures. The sample prepared with a high level of NAT 180 wax (1.5%) showed a process time of 18 minutes.

These results indicated that emulsions containing the NAT 180 (soy wax-castor wax blend) or NAT 155 (soy) waxes would aid in the re-pulping process, when present on the paper at a low level (between 0.5-1.5%) with the pH adjusted to convert the natural wax to a mild soap. The degree of change, as shown in the differences in the time needed to effect a pulp, is considered to be significant.

TABLE 1

Typical properties of Hydrogenated Soybean Oil (Archer Daniels Midland (Decatur Ill.) designated by their product number 86-197-0)

| Property | Typical analysis |
|---|---|
| Lovibond Red Color | 2.0 max |
| Saponification | 180 mgKOH/g |
| Viscosity | 60SUS @ 210 F. |
| Hardness (needle penetration) | 2 dmm @ 77 F. |
| % FFA Max.* | 0.10 max |
| Flavor Min. | Characteristic |
| P.V. Mil eq/kg/max. | 1.0 max |
| F.I. min** | 8.0 min |

TABLE 1-continued

Typical properties of Hydrogenated Soybean Oil
(Archer Daniels Midland (Decatur Ill.) designated by their product number 86-197-0)

| | Typical analysis |
|---|---|
| Specific gravity (H2O = 1) | 0.92 |
| % Moisture max. | 0.05 max |
| I.V. by R.I. | 2.0 max |
| Iron (ppm) | 0.3 max |
| Soap (ppm) | 3.0 max. |
| Nickel (ppm) | 0.02 max |
| Copper (ppm) | 0.05 max. |
| Phosphorous (ppm) | 15.0 Max |
| Residual Citric Acid (ppm) | 15.0 max |
| Mettler Drop Point (F.) | 155-160 |
| Typical Fatty Acid Composition (by GLC) | |
| C 14:0*** | 3.0 max |
| C 16:0 | 3-14 |
| C 18:0 | 82-94 |
| C 20:0 | 5 max |

*FFA: Free Fatty Acids.
**F.I.: FlavorIndex
***number of carbon atoms:number of double bonds (e.g., 18:2 refers to linoleic acid palmitic acid (16:0), stearic acid (18:0), oleic acid (18:1), arachidic acid (20:0) and behenic acid (22:0)

TABLE 2

Typical properties of Hydrogenated Palm Oil
(Custom Shortenings & Oils (Richmond, Va) product Master Chef Stable Flake-P.)

| Property | Typical analysis |
|---|---|
| Lovibond Red Color | 4.0 max |
| % Free Fatty Acids Max. | 0.10 max |
| Flavor Min. | Bland |
| Iodine Value. by R.I. | 5.0 max |
| Mettler Drop Point (F.) | 136-142 |
| Saponification | 185 mgKOH/g |
| Viscosity | 65 SUS @ 210 F. |
| Hardness (needle penetration) | 2-3 dmm @ 77 F. |
| Typical Fatty Acid Composition (by GLC) | |
| C 8:0* | 0.3% max |
| C 10:0 | 0.3 max |
| C 12:0 | 0.5% max |
| C 14:0 | 1.1% max |
| C 16:0 | 39.5% min |
| C 18:0 | 53.0% min |
| C 18:1 | 1.0% max |
| C 18:2 | 0.5% max |

*number of carbon atoms:number of double bonds (e.g., 18:2 refers to linoleic acid

TABLE 3

Properties of Castor Oil and Carnauba Waxes.

| Product/ Typical Properties | Color (Gardner D 1500) | Acid Value (mg KOH/g) | Iodine Value | Saponification Value (mg KOH/g) | Melting Point Degrees Celsius (ASTM D-127) | Hardness (dmm) ASTM D-5 |
|---|---|---|---|---|---|---|
| Hydrogenated Castor Oil (HCO) or Castor Wax | 3–7 | 2–3 | 3–4 | 174–186 | 84–85 | 2–4 |
| Carnauba wax | 2–5 | 2–15 | <1 | 78–88 | 83–85 | 1–2 |

TABLE 4

Repulping Evaluation

| Wax Sample | Control CITGO BLEND-KOTE ® 467 | Marcus Palm Oil Wax | Marcus Nat 155 Soy Wax |
|---|---|---|---|
| Sample Coating Weight lb/1000 sqft | 5.7 | 5.7 | 5.8 |
| Repulping test results | 3 | 0.5 | 2 |
| 0 = No particles evident | | | |
| 1 = small number of small particles evident | | | |
| 2 = Moderate number of small particles evident (less than control wax) | | | |
| 3 = Very large number of small particles are evident (Control wax) | | | |

TABLE 5

MVTR Evaluation (ASTM D3833)

| Wax Sample | Control CITGO BLEND-KOTE ® 467 | Marcus Palm Oil Wax | Marcus Nat 155 Soy Wax |
|---|---|---|---|
| Sample Coating Weight lb/1000 sqft | 5.8 | 5.6 | 5.7 |
| MVTR (Grams/100 sq inches in 24 hours) | 8.6 ± 0.9 | 14.5 ± 1.1 | 10.0 ± 0.4 |

We claim:

1. A process for the removal of ink from a fibrous cellulosic product, in which a wax-water emulsion is added to an alkaline aqueous mixture (at a temperature ranging from about 120 degrees F. to about 180 degrees F.) including fibrous cellulosic products containing ink, and removes the ink:

the emulsion comprising about 10% to about 50%, based on the total weight of the emulsion of a hydrogenated vegetable wax, the wax being characterized by having an iodine value of less than about 10, and a melting point of between 120 to about 200 degrees F. (Mettler drop point);

about 55% to about 75% by weight water, based on the total weight of the emulsion;

about 20% to about 45% solids, based on the total weight of the emulsion;

about 1% to about 25% by weight of a surface-active agent, based on the total weight of the emulsion; and about 0.02% to about 2.5% of an acid or base, based on the total weight of the emulsion; and wherein the wax is chosen from the group consisting of castor, soybean, palm, corn, cottonseed, rape, canola, sunflower, palm kernel, coconut, crambe, linseed and peanut.

2. The process as described in claim 1, further comprising adding the emulsion to the alkaline aqueous mixture in an amount ranging from about 0.1% to about 1% of the weight of the mixture.

3. A process to facilitate the removal of ink from fibrous cellulosic products containing ink, the process comprising the steps of:

immersing the fibrous cellulosic product containing ink in an alkaline, aqueous mixture at a temperature ranging from about 120 degrees F. to about 180 degrees F.;

adding an emulsion, the emulsion comprising:

about 10% to about 50%, based on the total weight of the emulsion, of a hydrogenated vegetable wax, the wax being characterized by having an iodine value of less than about 10, and a melting point of between 120 to about 200 degrees F. (Mettler drop point);

about 50% to about 90% by weight water, based on the total weight of the emulsion;

about 1% to about 25% by weight of a surface-active agent, based on the total weight of the emulsion; and about 0.02% to about 2.5% of an acid or base, based on the total weight of the emulsion; the emulsion being added in a quantity effective to remove the ink from the fibrous cellulosic product containing ink.

4. The process as described in claim 3, wherein the surface-active agent is chosen from the group consisting of non-ionic and cationic; surfactants.

* * * * *